A. C. PRATT.
WIND SHIELD.
APPLICATION FILED DEC. 28, 1917.
1,302,969.
Patented May 6, 1919.
2 SHEETS—SHEET 1.
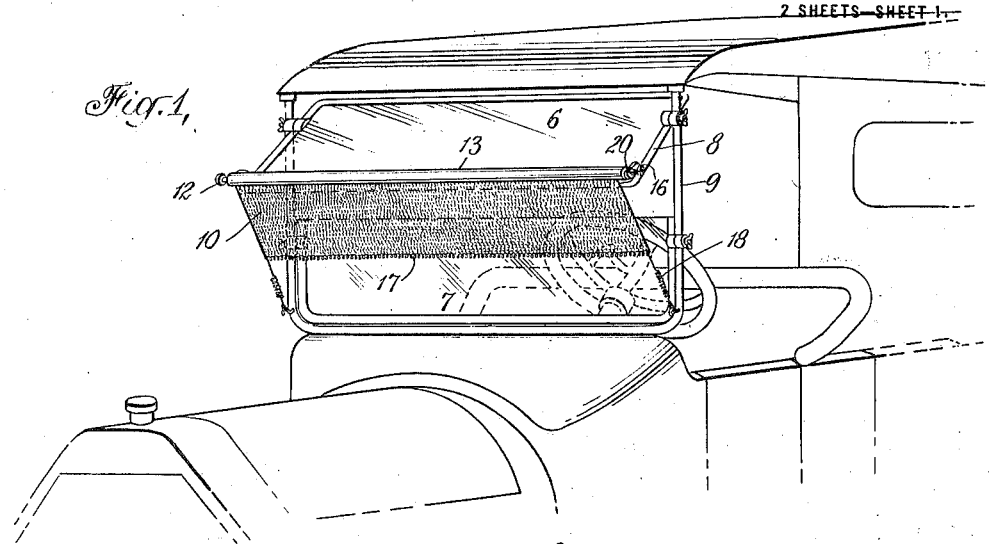
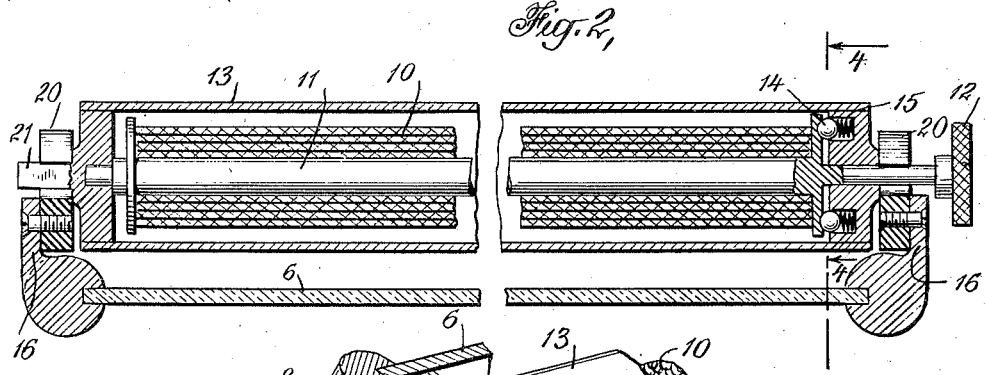
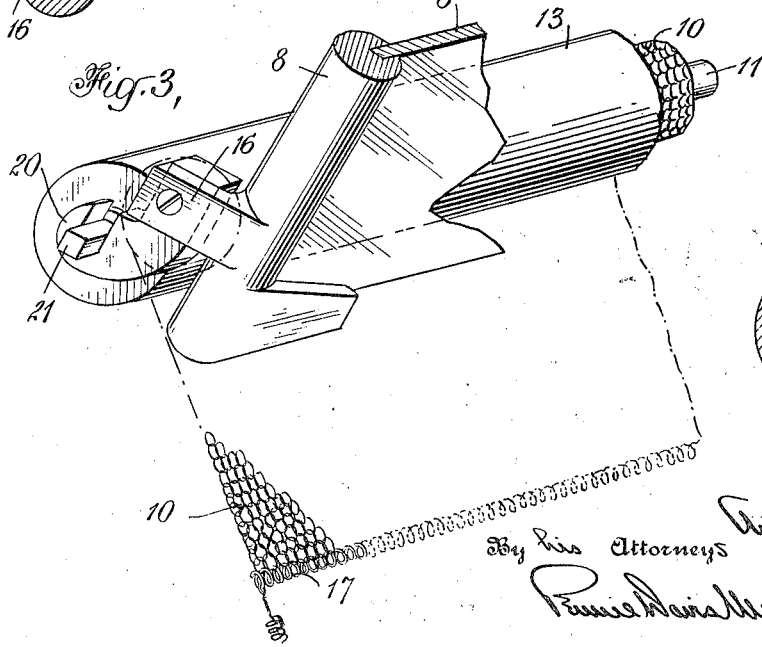
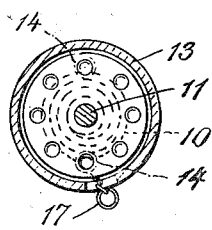

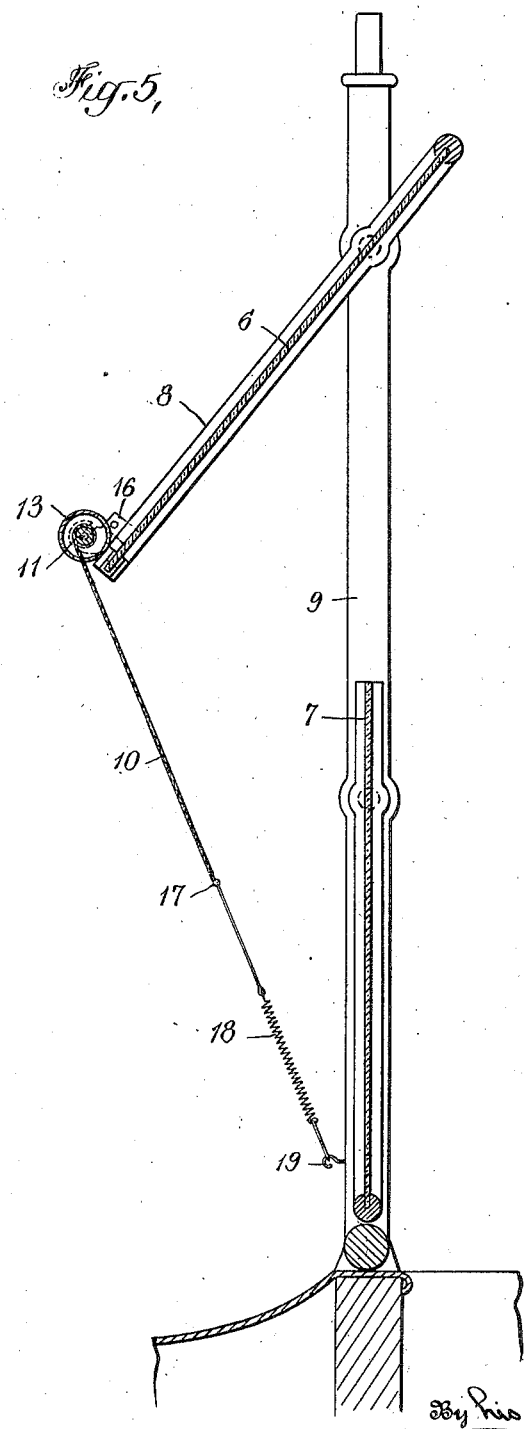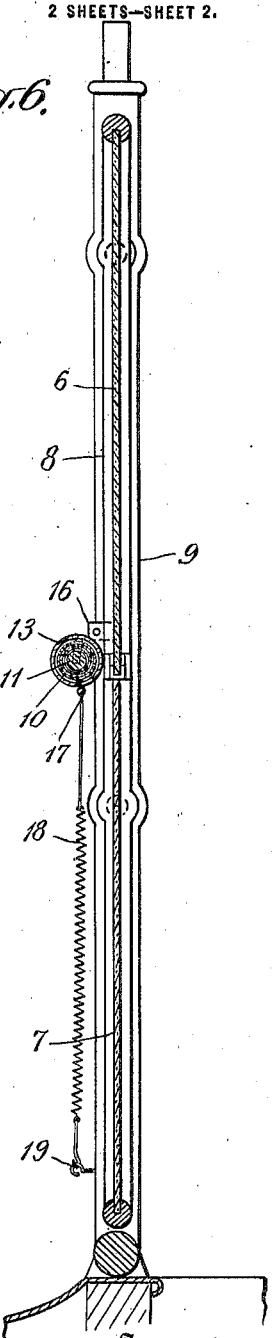

UNITED STATES PATENT OFFICE.

ALPHONSO COMSTOCK PRATT, OF DEEP RIVER, CONNECTICUT, ASSIGNOR TO WHITING & DAVIS COMPANY, A CORPORATION OF NEW YORK.

WIND-SHIELD.

1,302,969.     Specification of Letters Patent.    Patented May 6, 1919.

Application filed December 28, 1917. Serial No. 209,294.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Wind-Shields; and I do hereby declare the following to be a full, clear, and exact description of the invention, such as will enable others skilled in the art to which it appertains to make and use the same.

This invention relates to wind shields for automobiles and similar vehicles and is directed to the provision of a novel form of wind shield which affords better protection and at the same time does not obscure the vision. The invention involves the provision of a wind shield consisting in part of an opaque substance having a multiplicity of perforations therein, the perforations being so numerous and so close together as to make it possible to see through the wind shield with quite sufficient clearness.

The construction now most common in wind shields for automobiles involves a shield consisting of two rectangular plates of glass mounted one above the other and each arranged to be turned about a horizontal axis. When a car equipped with such a wind shield is proceeding on the road in a rain storm, the accumulation of water on the glass makes it difficult to see through the wind shield with sufficient clearness. The common practice under such conditions is to turn the upper glass about a horizontal axis to a position inclined more or less with respect to the vertical so that the driver of the car can see the roadway through the space between the upper and lower glasses of the wind shield. Under such conditions, however, drops of rain falling through the air enter the body of the car through the open space in the wind shield provided by so turning the upper glass. Also, drops of rain water accumulating at the lower edge of the upper glass are carried by the rush of air from the wind shield into the body of the car.

The present invention involves the provision of an improved form of wind shield from which these objectionable characteristics of wind shields of the type now in common use are eliminated while still permitting the driver of the car to see the roadway ahead of him sufficiently clearly. In accordance with the invention, the wind shield consists wholly or in part of a perforated metallic sheet, the perforations being in great number and close together so that the driver of the car sitting but a short distance behind the perforated sheet will be able to see the roadway through it without having his vision obscured. The form of perforated metallic sheet which I prefer to employ is a sheet of ring mesh fabric. Such a fabric, as is well known, consists of a multiplicity of intermeshing rings, the rings being arranged in rows crosswise and lengthwise of the fabric and each ring of the mesh being interlinked with four other rings. Such a sheet of link mesh fabric may be combined with a wind shield of the usual construction or substituted for one of the parts thereof so that a glass shield will be provided for use in fair weather and the foraminated metallic shield will be available for use when it is raining.

The embodiment of the invention which I prefer to employ consists of a wind shield of the usual type including two panes of glass pivoted to turn on horizontal axes and an auxiliary wind shield consisting of a foraminated metallic sheet, preferably a sheet of link mesh, attached to or adapted for attachment to the lower edge of the upper glass of the wind shield so that when this panel is turned on its horizontal axis to a position inclined to the vertical, the foraminated metallic sheet will depend from the lower edge of this upper glass panel and form a shield stretching across the space between the adjacent edges of the two glass panels through which space the operator looks while driving the car in a rain storm. Wind shields consisting of foraminated metallic sheets adapted for use in this manner may be constructed in any one of a great number of different ways. If desired, the sheet may be arranged for ready attachment to the supporting parts and detachment therefrom so that it may be carried in the tool box or other convenient receptacle on the car, except when it is needed for use in rainy weather; or, it may be arranged to be carried permanently in a rolled or folded condition upon or adjacent to the wind shield of the car and so connected that the operation of turning the upper glass panel of the wind shield from the vertical position draws the foraminated shield to its operative position. An arrangement of the foraminated metallic sheet which is specially convenient is to have it carried upon a roller which may be mounted upon the upper glass panel of the wind shield adjacent to the lower edge thereof. When the shield is not needed, it is rolled compactly upon a rod and contained within a casing which is provided with a slot at its lower edge. When the glass panel is turned on its horizontal axis from the vertical position the foraminated sheet may be unrolled, its lower edge passing out through the slot in the casing so that the shield depends from the lower edge of the glass panel. A construction of this character is illustrated in the drawings annexed hereto, but it will be understood that this construction is selected as illustrative only and that the invention is not limited to any particular construction but on the contrary comprehends broadly the use as a shield on an automobile or similar vehicle of any form of an opaque sheet provided with a multiplicity of perforations spaced so closely together that the shield does not obstruct the vision.

In these drawings, Figure 1 is a perspective view of a portion of an automobile having my improved shield applied thereto; Fig. 2 is a sectional view of the shield when rolled and the casing and supports therefor; Fig. 3 is a perspective view of one end of the shield and one of its supports; Fig. 4 is a transverse section on line 4—4 of Fig. 2; and Figs. 5 and 6 are vertical sections through the wind shield showing the upper glass in the open and closed positions.

Referring to these drawings, the wind shield includes the usual upper and lower plates of glass 6 and 7, each of which is provided with a metallic frame 8 around three of its edges. Each of these glass plates 6 and 7 is pivotally mounted upon the frame or support 9 extending upwardly from the body of the car so that the plate may be turned about a horizontal axis, as is usual in wind shields of this general type. Associated with these two glass plates is a foraminated metallic sheet 10 having a multiplicity of openings therethrough spaced close together. The type of sheet 10 that I prefer to use is a sheet of link mesh fabric. Such a sheet is readily flexible and the openings through the multiplicity of rings constituting the fabric are so close together that an operator sitting at a distance of two or three feet back of the sheet would experience no difficulty in seeing the roadway and other things in front of the car without having his vision materially obstructed.

The sheet 10 of link mesh is normally rolled up within a suitable container which is mounted in position along the lower edge of the upper glass panel 6. In Figs. 2 and 3, the sheet 10 is shown as rolled on a rod 11 which is mounted for rotation within a casing 13 provided with a slot on the lower side thereof through which the edge of the fabric may be drawn. The rod 11 is extended through one end of the casing 13 and its extreme end is provided with a hand wheel 12 by which the rod may be turned to wind the piece of fabric 10 on the rod or unwind it therefrom. Means are provided for holding the rod 11 in any position to which it may be turned. This is shown as an impositive lock in the form of balls 14 engaging depressions on the face of a disk on the rod 11 and held yieldingly in the depressions by springs 15.

The casing 13 is mounted in any suitable manner upon the frame 8 of the upper glass panel 6 adjacent to the lower edge of the panel. In Figs. 2 and 3, the frame 8 is shown as provided with projections 16 to which are secured brackets 20 slotted to receive a post 21 at one end of the casing 13 and the extension of the rod 11 at the other.

Preferably the lower edge of the sheet 10 of link mesh fabric is reinforced in some suitable manner. A convenient method of effecting such reinforcement is by bending a wire to a spiral formation with the convolutions spaced in accordance with the rings of the piece of mesh and then passing this wire through the several rings of the lowest row, each convolution passing through one of the rings. This type of reinforcement is indicated at 17 in Fig. 3. The wire constituting the reinforcement forms a convenient means for attaching the lower edge of the sheet 10 of mesh to some part lying below it to prevent flapping of the mesh in the wind, such as might cause drops of water to be thrown into the body of the car. In Fig. 1, connections 18 are shown as extending from the ends of the lower edge of the sheet 10 down to hooks 19 on the support 9, each of these connections having a spiral spring therein so as to hold the sheet 10 taut.

Fig. 6 shows the positions of the parts as they would be disposed under fair weather conditions. The casing 13 for the ring mesh sheet is mounted upon the frame of the upper glass 6 and extends along the line of junction of the two glasses. It is supported wholly at its ends and intermediate its ends it is of such small size in the vertical direction as not to objectionably obstruct the vision of the operator, particularly as it is a substantial distance below the level of his eyes. In a rain storm, the upper glass 6 would be moved about a horizontal axis to a position approximating that indicated in Fig. 5. This having been done, the sheet 10 of ring mesh fabric would be drawn out from the casing 13 through the slot therein by turning the handle 12 on the end of rod 11 in the appropriate direction and allowing the springs 18 to take up the slack in the sheet of mesh. The space between the two plates 6 and 7 would thus be bridged by the sheet 10 of ring mesh which would catch rain drops which otherwise would pass between the glass plates 6 and 7 and into the body of the car. The operator of the car looking out through the space between the adjacent edges of the two glass plates would be able to see the roadway clearly by reason of the great number and close spacing of the openings through the sheet 10.

I claim:

1. In an automobile or other vehicle, a support, a pair of coöperatively related glass plates mounted thereon one above the other and one of them adapted to be turned with relation to the other about a horizontal axis, thereby leaving a space between their adjacent edges, and a foraminated metallic sheet mounted to extend over said space; substantially as described.

2. In an automobile or other vehicle, a support, a pair of coöperatively related glass plates mounted thereon one above the other, the upper one being mounted to turn with relation to the lower one about a horizontal axis, a rod mounted on the upper glass plate adjacent to the lower edge thereof, and a sheet of link mesh fabric adapted to be rolled upon the rod; substantially as described.

3. In an automobile or other vehicle, a support, a pair of coöperatively related glass plates mounted thereon one above the other, the upper one being mounted to turn with relation to the lower one about a horizontal axis, thereby leaving a space between their adjacent edges, a foraminated flexible metallic sheet adapted to extend across said space, means for mounting the foraminated sheet with its upper edge overlapping the lower edge of the upper glass plate, means for reinforcing the lower edge of the foraminated sheet, and means for securing the reinforced lower edge of the sheet to the vehicle; substantially as described.

4. In an automobile or other vehicle, a shield embodying coöperatively related upper and lower glass plates, one adapted to be turned with relation to the other about a horizontal axis, thereby leaving a space between their adjacent edges, and a sheet of link mesh fabric mounted to extend over said space, said sheet having one edge overlapping the adjacent edge of the movable plate and its other edge connected to the vehicle.

5. In an automobile or other vehicle, a shield embodying coöperatively related upper and lower glass plates, one adapted to be turned with relation to the other about a horizontal axis, thereby leaving a space between their adjacent edges, and a sheet of link mesh fabric mounted to bridge said space.

6. In an automobile or other vehicle, a support, a pair of coöperatively related glass plates mounted thereon one above the other, the upper one mounted to turn with relation to the lower one about a horizontal axis, thereby leaving a space between their adjacent edges, a foraminated flexible metallic sheet adapted to extend across said space, and means for mounting the foraminated sheet with its upper edge overlapping the lower edge of the upper glass plate, the lower edge of the foraminated sheet being secured to the vehicle; substantially as described.

7. In an automobile or other vehicle, a support, a pair of coöperatively related glass plates mounted thereon one above the other, the upper one being mounted to turn with relation to the lower one about a horizontal axis, thereby leaving a space between their adjacent edges, a foraminated flexible metallic sheet adapted to extend across said space, a rod to which the upper edge of the sheet is connected and upon which the sheet may be rolled up, and spring means associated with the lower edge of the sheet for connecting said edge to the vehicle and for taking up slack in the sheet when the latter is unrolled.

In testimony whereof I affix my signature.

ALPHONSO COMSTOCK PRATT.